US007872368B2

(12) United States Patent
Karimi et al.

(10) Patent No.: US 7,872,368 B2
(45) Date of Patent: Jan. 18, 2011

(54) INTELLIGENT ENERGY MANAGEMENT ARCHITECTURE

(75) Inventors: Kamiar J. Karimi, Kirkland, WA (US); Joseph S. Breit, Bellevue, WA (US); Steven B. Helton, Redmond, WA (US); Trevor M. Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 12/257,553

(22) Filed: Oct. 24, 2008

(65) Prior Publication Data

US 2010/0102625 A1    Apr. 29, 2010

(51) Int. Cl.
    *B60L 1/00*    (2006.01)
(52) U.S. Cl. ....................................................... 307/9.1
(58) Field of Classification Search .................. 307/9.1, 307/43
    See application file for complete search history.

(56) References Cited

U.S. PATENT DOCUMENTS

| 6,664,656 | B2 | 12/2003 | Bernier |
| 7,207,521 | B2 | 4/2007 | Atkey et al. |
| 7,210,653 | B2 | 5/2007 | Atkey et al. |
| 7,373,222 | B1 * | 5/2008 | Wright et al. ............... 700/295 |
| 2004/0061380 | A1 | 4/2004 | Hann et al. |
| 2005/0231038 | A1 | 10/2005 | Marin-Martinod et al. |
| 2006/0085100 | A1 | 4/2006 | Marin-Martinod et al. |
| 2006/0267406 | A1 | 11/2006 | Mehrer et al. |
| 2007/0284480 | A1 | 12/2007 | Atkey et al. |

FOREIGN PATENT DOCUMENTS

EP    1650846    4/2006
WO    WO 2008113850    9/2008

OTHER PUBLICATIONS

Fromherz et al., Coordinated Control for Highly Reconfigurable Systems [Invited Paper and Presentation], HSCC 2005, Mar. 2005, Palo Alto Research Center, (37 pgs).
Jennifer Ernst, Embedded Reasoning: Model-based design for highly reconfigurable systems, 2006, Palo Alto Research Center, (5 pgs).
Zelazo et al., Adaptive Load Management, University of Washington—Aeronautics and Astronautics, Sep. 17, 2007, (40 pgs).
PCT International Search Report and Written Opinion of the International Searching Authority, International Application No. PCT/US2009/057540, Jun. 29, 2010, European Patent Office, (10 pgs.).

* cited by examiner

*Primary Examiner*—Robert L. Deberadinis
(74) *Attorney, Agent, or Firm*—Toler Law Group

(57) ABSTRACT

Systems and methods are disclosed for a power control system including intelligent devices. A vehicle power control system includes a power supply configured to supply a first quantity of power to at least one device configured to consume power based on a first power demand. The vehicle power control system also includes an intelligent device configured to determine a second power demand for the intelligent device during a vehicle operation. The vehicle power control system also includes an energy management system. The energy management system is configured to communicate with the at least one the intelligent device regarding the second power demand of the at least one intelligent device to coordinate scheduling of power distribution during the vehicle operation in order to generate a power distribution schedule to account for the first power demand of the at least one device and the second power demand of the at least one intelligent device. The energy management system directs the first quantity of power to the at least one device according to the first power demand of the at least one device and directs a second quantity of power to the at least one intelligent device according to the power distribution schedule.

20 Claims, 5 Drawing Sheets

INTELLIGENT ENERGY MANAGEMENT ARCHITECTURE

FIELD OF THE DISCLOSURE

The present disclosure is generally related to managing distribution of power among a number of devices.

BACKGROUND

Complex systems, such as aircraft, incorporate many devices that consume electrical power. A challenge is presented when a system may be supported by a power source capable of supplying a maximum amount of power and, at certain points during system operation, the devices may require more than the maximum amount of available power. Some devices may only require power at certain times. Unfortunately, many devices that may only require power intermittently or periodically may seek to consume power at the same time that other devices also require power, thereby resulting in an aggregate power demand in excess of an available supply.

Conventionally, when the demand for power exceeds the available supply, some devices seeking power may not be provided power and some devices currently being provided power may be cut off. Devices may be assigned priority so that devices that may be considered important may not be shut down or may be among the last to be shut down. For example, among aircraft systems, environmental control systems may be accorded a higher priority than galley appliances or on-board entertainment systems. As a result, when the demand for power exceeds the available supply of power, the galley appliances and on-board entertainment systems may be shut down before the environmental control systems may be shut down.

Conventional power distribution systems may be responsive to present demands. Thus, in the foregoing example, although it might be possible to sequentially provide power to either the galley appliances or the on-board entertainment systems so that neither may be abruptly shut down, conventional systems manage only to present demands.

SUMMARY

Embodiments disclosed herein include systems that communicate with one or more intelligent devices and power sources according to a generated power distribution schedule in order to allocate the distribution of power to vehicle systems during operation. A vehicle power control system includes one or more intelligent devices that are configured to communicate power demands during vehicle operations as well as to respond to instructions to reduce or increase power consumption. The vehicle power control system also includes one or more intelligent power sources configured to harvest power during portions of a vehicle operation when more power may be available than is being consumed and to make the harvested power available at a later point in time. By communicating with intelligent devices and intelligent power sources as well as other devices and power sources, the vehicle power control system can generate a power distribution schedule for vehicular operation. The vehicle power control system can direct intelligent devices and intelligent power sources to reduce power consumption or increase power output, respectively, according to the power distribution schedule to manage power distribution.

In one particular illustrative embodiment, a vehicle power control system includes a power supply configured to supply a first quantity of power to at least one device configured to consume power based on a first power demand. The vehicle power control system also includes an intelligent device configured to determine a second power demand for the intelligent device during a vehicle operation. The vehicle power control system also includes an energy management system. The energy management system is configured to communicate with the at least one intelligent device regarding the second power demand of the at least one intelligent device to coordinate scheduling of power distribution during the vehicle operation in order to generate a power distribution schedule to account for the first power demand of the at least one device and the second power demand of the at least one intelligent device. The energy management system directs the first quantity of power to the at least one device according to the first power demand of the at least one device and directs a second quantity of power to the at least one intelligent device according to the power distribution schedule In another particular illustrative embodiment, the system is an aircraft power distribution system that includes one or more devices and one or more intelligent devices configured to determine power demands during a flight. An energy management system receives power from one or more power sources that include a primary power source configured to generate an expected quantity of power and a supplemental power source configured to be activated by the energy management system to receive power to be stored for later use. The energy management system communicates with the one or more intelligent devices regarding the power demands to coordinate scheduling of power distribution during the flight and generates a power distribution schedule to account for an aggregate power demand of the one or more devices and the one or more intelligent devices. The power distribution schedule is modified to reschedule or eliminate operation of the one or more intelligent devices and to direct the power to the one or more devices and the one or more intelligent devices.

In still another particular illustrative embodiment, a method is provided. The method communicates with at least one intelligent device and at least one intelligent power source to coordinate scheduling of power distribution. The method determines a total demand for power to be consumed by the intelligent device and by other devices. The method also determines a total supply of power available from a primary power source and at least one intelligent, supplementary power source that harvests and stores power. The method generates a power schedule based on the total demand for power and the total supply of power, and then directs power to both intelligent devices and other devices according to the power schedule.

The features, functions, and advantages that have been discussed can be achieved independently in various embodiments or may be combined in yet other embodiments further details of which can be seen with reference to the following description and drawings.

DETAILED DESCRIPTION

In accordance with particular illustrative embodiments, a power control system engages intelligent devices that report power demands and that control the intelligent device's power consumption. The power control system includes intelligent power sources configured to store and supply power to account for the power demands. The power control system has information describing the power demands reported by intelligent devices, power demands for other devices, and the power available from intelligent sources and other sources. Using this information, a power distribution schedule may be created to account for how much power may be consumed by the devices during vehicular operation. Intelligent devices and intelligent power sources can be directed to control power consumption and to control power supply, respectively, to provide availability of power for devices during the vehicular operation.

Figure 1:
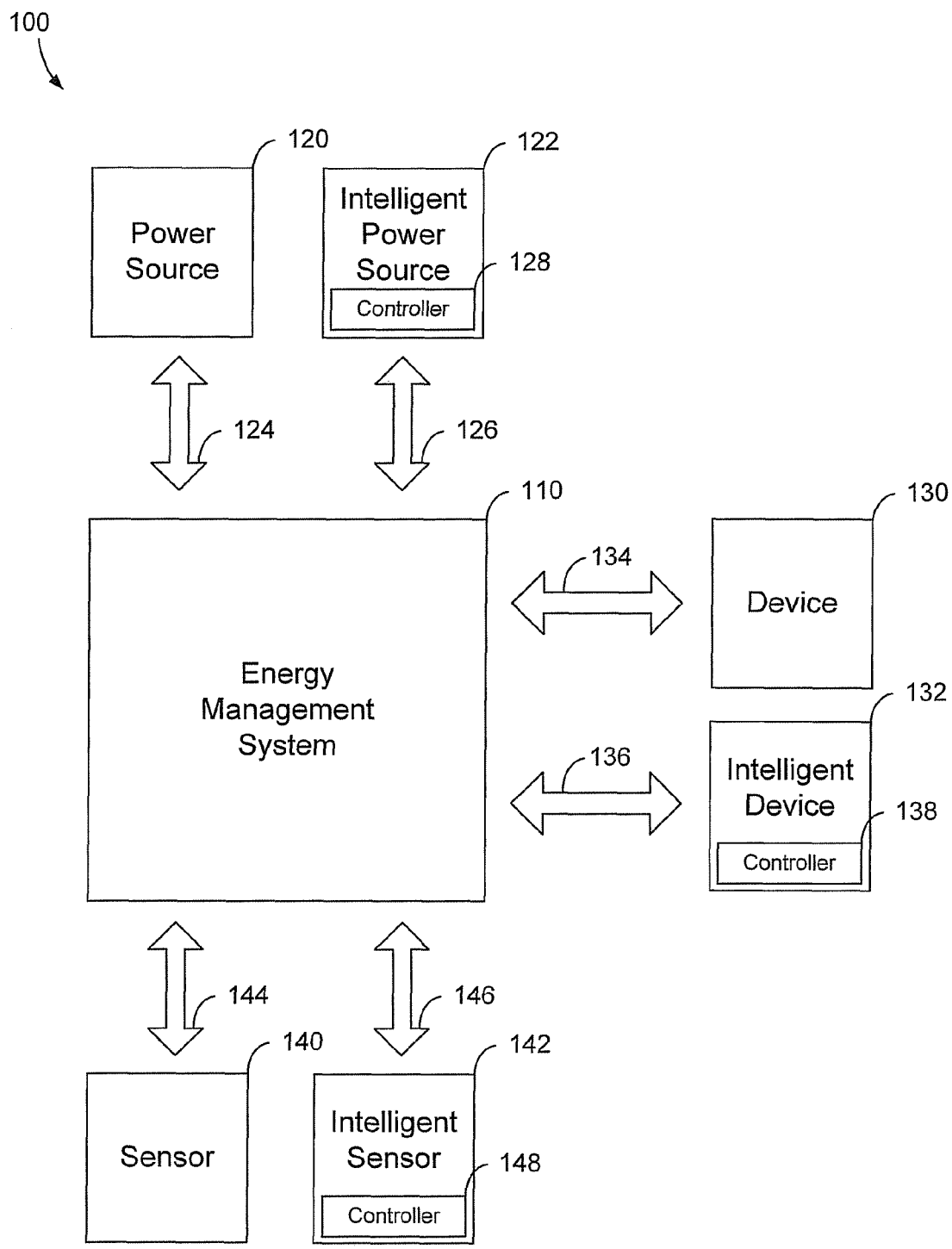
FIG. 1 is a block diagram of a particular illustrative embodiment of a power management system.

FIG. 1 is a block diagram of a particular illustrative embodiment of a vehicle power management system, generally designated 100. The vehicle power management system 100 includes an energy management system 110. The energy management system 110 manages the distribution of power received from at least one power source 120 and at least one intelligent power source 122. The energy management system 110 may include one or more separate devices or the energy management system 110 may be integrated with a power control unit or power distribution unit, as further described below with reference to FIGS. 3 and 4. The energy management system 110 may distribute the power received to at least one device 130 and at least one intelligent device 132. The intelligent device 132 may include a controller 138, which may constitute a sensor feedback loop for the device that communicates with the energy management system 110 to facilitate operation of the intelligent energy management architecture, as further described below. The energy management system 110 may be configured to generate a power distribution schedule to account for which of the devices 130 and 132 receive power at various points of operation, as well as the availability of power to be provided by the power sources 120 and 122.

In a particular illustrative embodiment of FIG. 1, it is assumed that the power source 120 provides a supply of power that may be constant throughout vehicle operation, may be constant over each of the plurality of phases of operation unless the energy management system 110 directs the power source 120 to an idle or off state, or may be varied under the control of the energy management system 110. An intelligent power source 122 may include a controller 128, which may constitute a sensor feedback loop for the intelligent power source 122, that communicates with the energy management system 110 to facilitate operation of the intelligent energy management architecture, as further described below. The intelligent power source 122 may be an adaptive power source that can selectively supply a variable quantity of power. The intelligent power source 122 also may be configured to store power and subsequently supply regenerated power to supplement the power source 120 in response to instructions from the energy management system 110. The power source 120 may include any type of power source. In a vehicle, such as an aircraft, watercraft, or land vehicle, for example, the power source 120 may include a power-train driven generator that generates electrical power from rotational movement of an engine. Alternatively, the power source 120 may include a battery, a chemical or nuclear fuel cell, or any other type of power source configured to provide a quantity of power. The intelligent power source 122 may include any type of controllable power source, such as power source, such as a battery, a nuclear cell, a fuel cell, a flywheel, an electric double-layer supercapacitor (supercap) or ultracapacitor (ultracap), a thermoelectric device to capture waste heat, a diesel generator, a photovoltaic cell, a radio frequency (RF) energy harvester configured to harvest power from RF signals, a vibration energy harvester, or a turbine.

In one particular illustrative embodiment, the intelligent power source 122 may be configured to harvest power and to supply regenerated power as instructed by the energy management system 110. The controller 128 may respond to commands to harvest an excess of power produced by one or more of the other power sources or other sources, and store the excess power until a later time when the stored power may be used to supplement the power produced by the other power sources.

The intelligent power source 122 may be used to provide power to supplement the power available from the power source 120. For example, according to the power distribution schedule developed by the energy management system 110, when the energy management system 110 determines that more power may be required than the power source 120 can supply, the energy management system 110 may direct the intelligent power source 122 to provide additional power for distribution to end devices. In an embodiment including one or more intelligent power sources 122 configured to harvest power, to be able to provide additional power at a later point during vehicle operation, the energy management system 110 may determine at what points during operation the power source 120 supplies more power than may be expected to be consumed and directs the intelligent power source 122 to harvest power at those points to be stored for later use. The power harvested and stored then can be drawn upon at a later time during vehicle operation to provide the additional power.

In developing a power distribution schedule, the energy management system 110 may consider power demands of the devices 130 and 132 and sensors 140 and 142. The device 130 or the sensor 140 may consume a fixed or substantially constant amount of power when in operation, and the device 130 and the sensor 140 may always be in operation when the system 100 is in operation unless the energy management system 110 directs the device 130 or the sensor 140 to an idle or off state. For example, in the case of an aircraft, the device 130 may include a cabin air recirculation fan that runs whenever the aircraft is operational. Similarly, the sensor 140 may include a thermostat that monitors the interior cabin temperature whenever the aircraft is in operation. The power consumption of the device 130 and sensor 140 may be substantially the same whenever the system 100 is in operation, thus the power consumption of both the device 130 and the sensor 140 may be fixed and known.

Alternatively, the power demands of the intelligent device 132 and the intelligent sensor 142 may operate selectively and at selective power levels. For example, the intelligent device 132 may include an environmental control system to control the cabin temperature, or a passenger comfort device, such as an oven, a beverage maker, or other galley appliance, that can be selectively activated and deactivated according to other power demands that may take priority. The intelligent device 132 may also be configured to operate at a reduced power level. For example, the environmental control system may be configured to respond to a request to reduce power to an air conditioning system, allowing the cabin temperature to increase within a tolerable range. As a further example, a galley appliance may be configured to operate at a lower heat setting. Similarly, the intelligent sensor 142 may include a sensor that need not be in operation during particular phases of the flight. The intelligent device 132 and the intelligent sensor 142 thus may be configured to reduce power consumption, assume a standby state from which the intelligent device 132 and the intelligent sensor 142 may be reactivated, or be fully powered off. Additionally, the intelligent device 132 may be configured to respond to a request to increase its power consumption. The intelligent device 132 may be requested to increase its power consumption when, for example, increased power consumption will bring about a desired change in performance of the intelligent device 132. Alternatively, the intelligent device 132 may be requested to increase power consumption to dissipate excess power available in the system.

In addition to responding to power consumption instructions, the intelligent device 132 and the intelligent sensor 142 may be configured to respond to communicate with a controller or a management system, such as the energy management system 110, or to communicate with another intelligent subsystem. The intelligent device 132 and the intelligent sensor 142, for example, may be configured to respond to requests for information about power consumption. Taking the example of other non-continuously operating devices, an in-flight entertainment system may be queried to determine how much power it may consume during screen deployment, during display operations, and during other phases so that the energy management system 110 can consider such power demands to coordinate scheduling of power distribution for purposes of generating a power distribution schedule.

Each of the intelligent subsystems, including the intelligent power source 122, the intelligent device 132, and the intelligent sensor 142 may include one or more controllers to respond to queries and commands from the energy management system 110. The controllers may include microcontrollers or other devices configured to communicate with the energy management system 110 or another controller or management device to coordinate operation of the intelligent power source, device, or sensor. For example, the intelligent power source 122 may include a controller 128 that is configured to receive and respond to commands to supply power. Further, the controller 128 may be configured so that the intelligent power source 122 may supply a controlled amount of power that is less than its maximum capacity. The controller 128 also may be configured so that the intelligent power source 122 may respond to requests for its current capability to supply power or its anticipated capability to supply power at a later point of operation. The controller 128 of the intelligent power source 122 also may be configured to receive commands to harvest and store power, as further described below, to provide regenerated power to supplement power provided by the power source 120.

Similarly, the intelligent device 132 includes a controller 138 that responds to queries from the energy management system 110 regarding power demands during periods of operation of the vehicle as well as to respond to power usage commands such as commands to reduce power consumption, assume a sleep mode, or power down. The intelligent sensor 142 also includes a controller 148, such as a sensor feedback loop, that responds to queries from the energy management system 110 regarding power demands during periods of operation of the vehicle as well as to respond to power usage commands.

A potential benefit of the controllers 128, 138, and 148 is that the associated intelligent power source 122, intelligent device 132, and intelligent sensor 142, respectively, may be automatically configurable so that they may be deployable as "plug and play" devices. In other words, as an example, when the intelligent device 142 is installed in an aircraft, the intelligent device 142 may be configured to communicate with the energy management system 110 or another controller or management system. As part of this communication, the energy management system 110 may be able to determine the function and nominal expected power demands of the intelligent device 142 without manual programming or configuring of the energy management system 110. As a result, the intelligent device 142 can automatically participate in the coordination and scheduling of power distribution.

Figure 2:
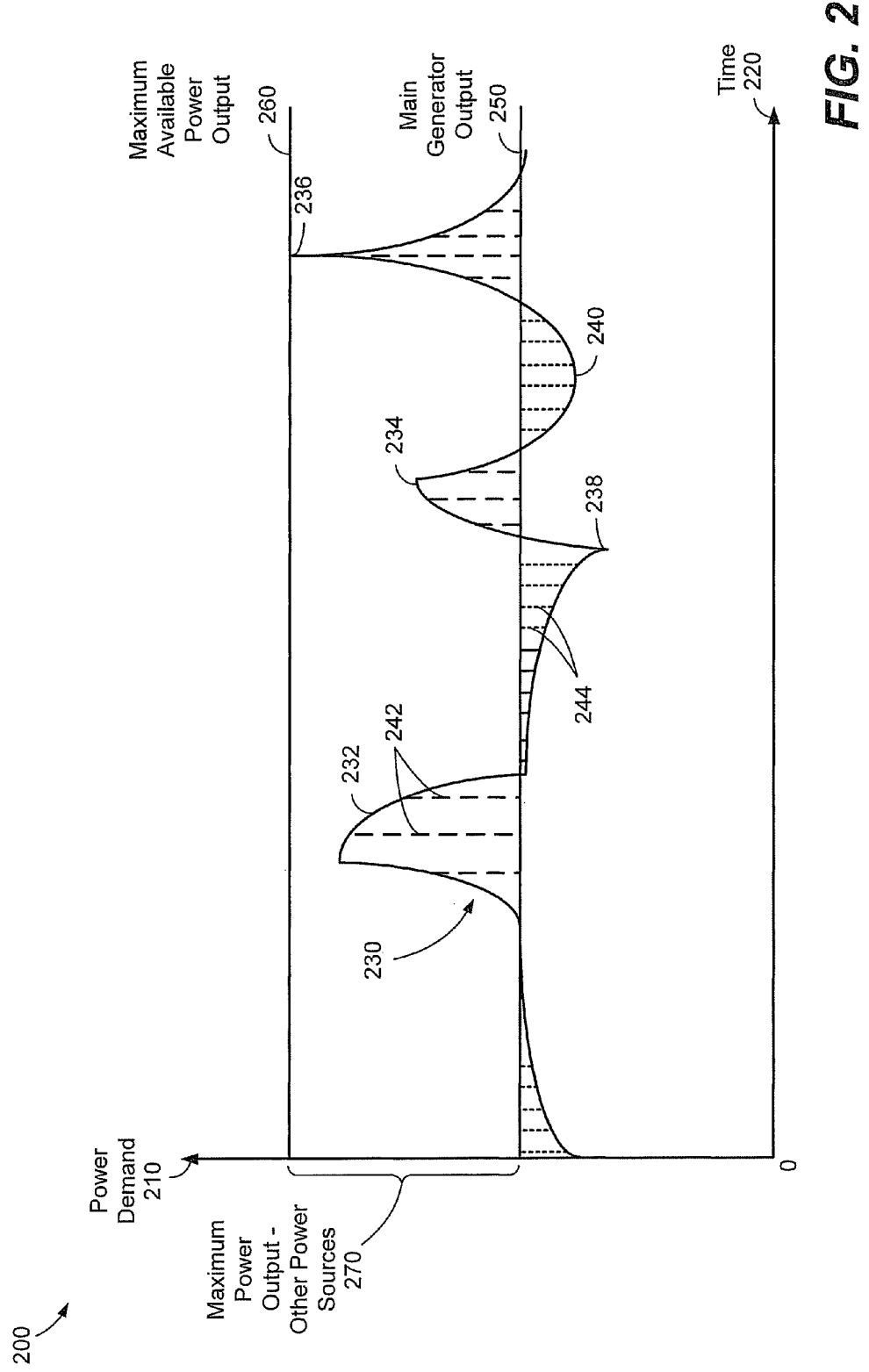
FIG. 2 is a graph depicting a response of an aircraft power system that is equipped with a main generator and other power sources illustrating a response to changes in aggregate power demand during the course of a flight.

FIG. 2 is a graph 200 depicting a response of an aircraft power system that is equipped with a main generator and other power sources illustrating a response to changes in aggregate power demand during the course of a flight. The graph 200 illustrates a power demand 210 plotted over time 220. An aggregate power demand curve 230 is plotted on the graph 210, which also includes a main generator output limit 250 and a maximum available power output limit 260. The difference in power between the main generator output limit 250 and the maximum available power output limit 260 is the power provided by a maximum power output of other power sources 270. The other power sources, as previously described, may include fuel cells and batteries as well as one or more intelligent power sources, such as rechargeable batteries or supercaps that may be available to supplement the power output of a main generator.

The aggregate power demand curve 230 includes a number of peaks 232, 234, and 236 which represent a power demand in excess of the main generator output limit 250. During these peaks in power demand, power may be drawn from the other power sources to provide the additional power needed. The power output of the other power sources is represented by dashed lines 242 between the aggregate power demand curve 230 and the main generator output limit 250. A maximum combined output of the main generator and the other power sources is represented by the maximum available power output 260; thus, the aggregate power demand curve 230 cannot exceed the maximum available power output limit 260. However, the aggregate power demand curve 230 may reach up to the maximum available power output limit 260, as reflected by the peak 236 reaching the maximum available power output limit 260. As previously described, power consumption of intelligent devices or intelligent sensors may be reduced so that aggregate power demand remains within a maximum available power output of the system.

The aggregate power demand curve 230 illustrates that, at various times, the aggregate power demand may be below that of the main generator output limit 250. At these times, represented by valleys 238 and 240, the main generator provides excess power. At these times, the other power sources, including the intelligent power sources, may harvest the excess power for use at other times when the aggregate power demand exceeds the main generator output limit 250. The excess power available for harvesting is represented by dotted lines 244.

According to illustrative embodiments of the present disclosure, an energy management system can react to changes in aggregate power demand to selectively reduce power consumption by one or more intelligent devices or sensors, or to selectively increase power supply by use of one or more intelligent power sources. In addition, some intelligent devices and intelligent sensors may be able to predict their power demands to enable coordination of power distribution scheduling.

Figure 3:
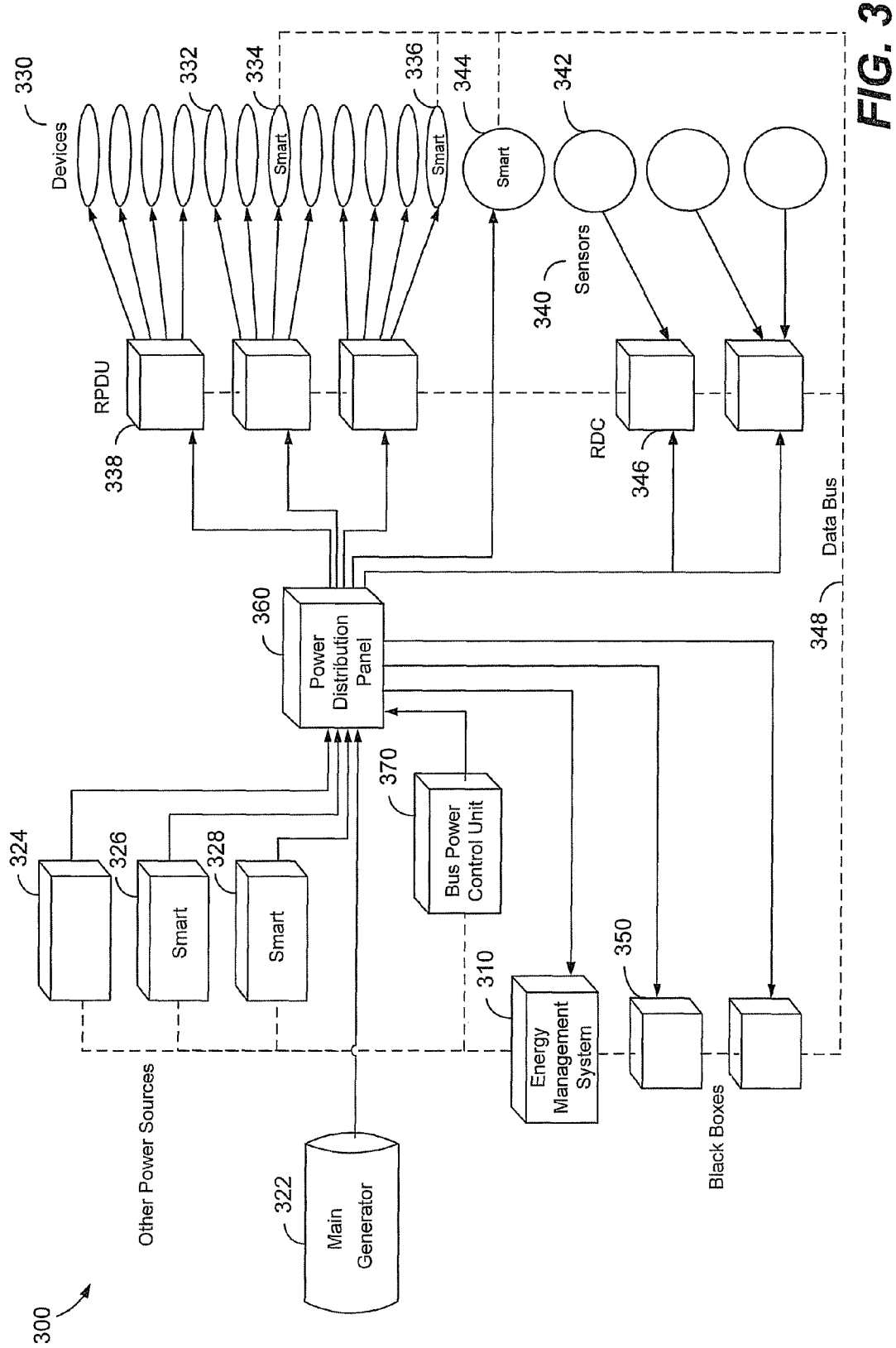
FIGS. 3 and 4 are block diagrams of particular illustrative embodiments of a power management system employing an intelligent energy management architecture.

FIG. 3 is a block diagram of a particular illustrative embodiment of a power management system, generally designated 300, employing an intelligent energy management architecture in an aircraft system including multiple intelligent or "smart" devices to enable control over aggregate power consumption and aggregate power capacity to provide that power demands may be met throughout operation of the aircraft. As described with reference to FIG. 1, the power management system 300 includes ordinary power sources, devices, and sensors as well as intelligent power sources, intelligent devices, and intelligent sensors to provide for control over power consumption and capacity.

The power management system 300 includes a power distribution panel 360 to which the devices 330 and sensors 340 that consume power may be coupled and to which power sources 322-328 may be coupled to provide power to the devices 330 and the sensors 340. The devices 330, the sensors 340, and the power sources 322-328 may be coupled to the power distribution panel 360 either directly or indirectly through remote units (further described below). According to an embodiment of the present disclosure, the bus power control unit 370 may be configured to automatically reconfigure power buses to preserve flight critical operations. The bus power control unit 370 may operate in conjunction with the power distribution panel 360 to perform rapid bus switching. For example, if power from one power source used to supply power to a flight critical system is lost or if a bus used to supply that power is lost, the bus power control unit 370 rapidly performs bus switching to redirect or reroute power to the flight critical systems. In one embodiment, the bus power control unit 370 also may be configured to employ a deterministic state machine that monitors a current demand for power and a current supply for power and, when demand exceeds supply, automatically shuts down non-flight-critical devices or shed loads to ensure that there is enough power for flight-critical operations.

The illustrative embodiment of the power management system 300 also includes an energy management system 310 that may be configured to operate with the intelligent devices, sensors, and power sources to assist in controlling aggregate power capacity and aggregate power consumption and to generate a power distribution schedule so that capacity at least meets consumption demands. The energy management system 310 may work with the power distribution panel 360 to selectively direct power to intelligent devices and sensors and to draw power from intelligent power sources.

The power management system 300 may receive power from a main generator 322 that may serve as a primary power source. In an aircraft, the primary power source may include a main generator coupled to one or more engines to generate electrical power from the mechanical energy resulting from the rotation of the aircraft engines. The power management system 300 also receives power from an additional "non-intelligent" power source 324. The power source 324 may include a battery that may be available for emergency power demands. The energy management system 310 may be configured to draw power from the main generator 322 and the power source 324. However, as indicated by the lack of feedback paths to the main generator 322, the energy management system 310 may not control when the main generator 322 operates, but may be configured to control when the power source 324 operates to provide power to supplement the main generator 322. Alternatively, although not shown in FIG. 3, the energy management system 310 may be configured to control operation of the main generator 322 as well as other power sources included in the system 300. The energy management system 310 may control the power source 324 directly or through another line replaceable unit (LRU).

One should note that the main generator 322 itself may be an intelligent power source. The main generator 322 may be configured to include a controller (not shown in FIG. 3) to enable the main generator 322 to respond to queries regarding current or anticipated power capacity and capability, or to respond to commands to regulate its output of power.

The embodiment of the power management system 300 shown in FIG. 3, for illustration, includes two intelligent or "smart" power sources 326 and 328. The smart power sources 326 and 328, like the main generator 322 and the power source 324, may be coupled to the energy management system 310, enabling the energy management system 310 to draw power from the smart power sources 326 and 328 as appropriate to meet power consumption demands. The smart power sources 326 and 328 each include a controller 128 as shown in the intelligent power source 122 of FIG. 1. As previously described, the controllers 128 may enable each of the smart power sources 326 and 328 to respond to requests about power capacity, current or projected power supply capabilities, or to supply a controlled quantity of its available power. Further, in one embodiment, the intelligent power sources 326 and 328 also may be coupled to receive input from the energy management system 310 enabling the energy management system 310 to direct the intelligent power sources 326 and 328 to harvest power and store power to meet subsequent power consumption demands. FIG. 3 shows two smart power sources 326 to 328 to represent that multiple intelligent power sources may be included to operate selectively and independently to meet power consumption demands.

The energy management system 310 also may control the supply of power to multiple devices 330. The devices include "non-intelligent" devices, such as device 332 that draw power when the aircraft is in operation. The energy management system 310 may or may not be configured to query the device 332 or control whether the device 332 receives power. In one embodiment, the energy management system 310 may be configured to control all systems and devices within the system 300. Alternatively, the operation of some flight-critical devices may be not be under the control of the energy management system 310 to ensure, for example, that some designated devices will not be partially or completely shut down during operations. At the same time, other devices and intelligent devices may be under the control of the energy management system 310 to enable the energy management system 310 to manage these devices to control aggregate power consumption. The devices 330 in the system 300 may include multiple intelligent or "smart" devices, such as smart devices 334 and 336 that can be queried as to power consumption and have their power consumption controlled by the energy management system 310 to control aggregate power consumption. The power management system 300 may include one or more remote power distribution units (RPDUs) 338 under the control of the energy management system 310. Thus, the energy management system 310 can control which devices 330 receive power.

The energy management system 310 also may control the supply of power to multiple sensors 340. The sensors include "non-intelligent" sensors, such as sensor 342. A non-intelligent sensor 342 may be configured to draw power when the aircraft is in operation and may not be configured to respond to queries from the energy management system 310 or may not be under the control of the energy management system 310. On the other hand, the sensors 340 may include multiple intelligent or "smart" sensors, such as the smart sensor 344 that can be queried as to power consumption and have its power consumption controlled by the energy management system 310 to control aggregate power consumption. The power management system 300 may include one or more remote data concentrators (RDCs) 346 under the control of the energy management system 310. The RDCs 346, like the RPDUs 338, enable multiplexing of signals from the sensors 340 on a data bus 348 and, thus, enable reduced wiring complexity between the sensors 340 and "black boxes" 350 and other systems that read the outputs of the sensors.

Figure 4:
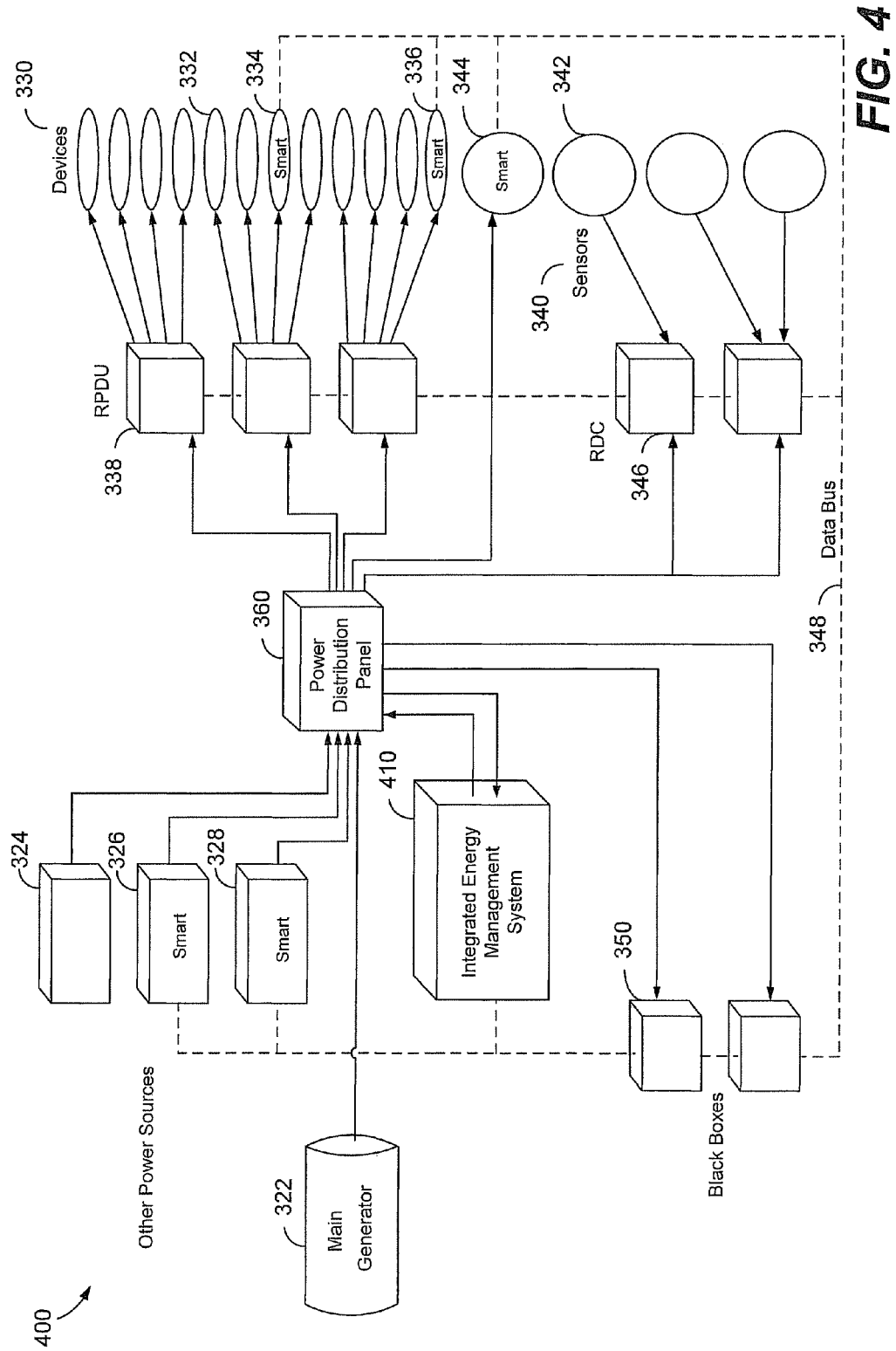

FIG. 4 is a block diagram of another particular illustrative embodiment of a power management system, generally designated 400, employing an intelligent energy management architecture in an aircraft system including multiple intelligent or "smart" devices to enable control over aggregate power consumption and to aggregate power capacity to provide that power demands may be met throughout operation of the aircraft. The components and the operation of the power management system 400 may be the same as for the power management system 300 of FIG. 3 with one exception. The power management system 300 of FIG. 3 includes a separate bus power control unit 370 and a separate energy management system 310. By contrast, the power management system 400 includes an integrated energy management system 410. The integrated energy management system 410 incorporates the functions of both the energy management system 310 and the bus power control unit 370 of FIG. 3 to control the supply and provision of power to all vehicle devices and systems.

Figure 5:
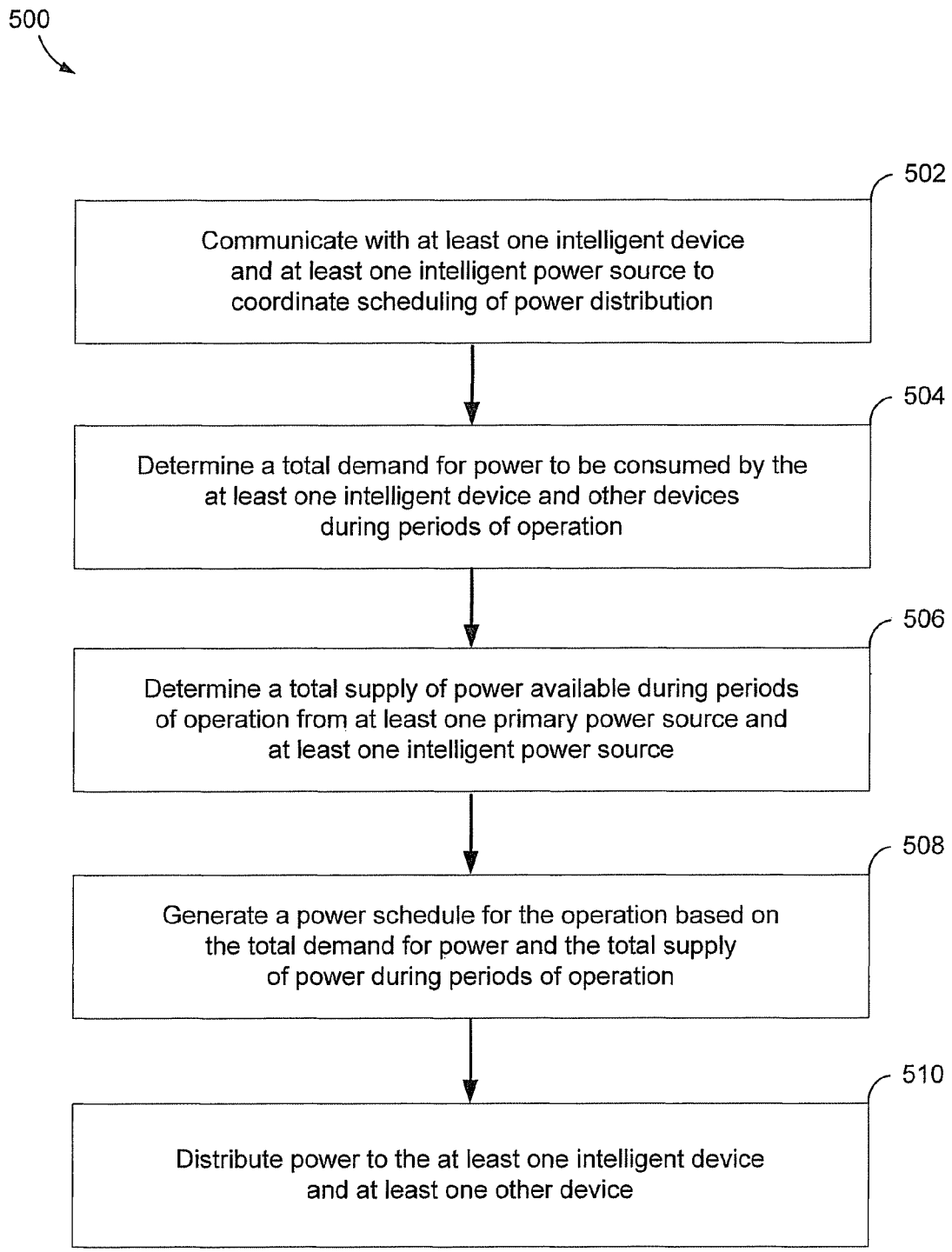
FIG. 5 is a flow chart of a particular illustrative embodiment of a method of interactively managing power distribution using intelligent devices.

FIG. 5 is a flow chart 500 of a particular illustrative embodiment of a method interactively managing power distribution using intelligent devices as previously described with reference to FIGS. 1-3. At 502, communication may be established with at least one intelligent device and at least one intelligent power source to coordinate scheduling of power distribution, as previously described. At 504, a total or aggregate demand for power to be consumed by the at least one intelligent device and by other devices may be determined for the periods over the course of the operation.

For example, the power demand for devices, such as aircraft control devices, the power demand for climate control systems, and the power demand for intelligent devices, such as galley appliances, may be determined. The power demand for the aircraft control devices may be high during a takeoff period and a subsequent period while the aircraft climbs to a cruising altitude, and the power demand for the climate control systems may be substantially constant during each of the periods of the flight. On the other hand, the power demand of the intelligent galley appliances may exceed the amount of power available during the takeoff period and the climbing period. Thus, power to the galley appliances may be reduced or cut during the takeoff period and the climbing period and later provided to the galley appliances during a subsequent period. Similarly, in other vehicles such as trains, buses, ships, and other powered vehicles, power to entertainment systems or other systems not related to safety or locomotion may be reduced or cut during periods when power may be needed for engines, vehicle control devices, or devices and subsystems more essential to the operation of the vehicle.

At 506, a total or aggregate supply or capacity of power available from at least one primary power source and at least one intelligent power source may be determined over the periods of operation. The intelligent power supply, as previously described in one particular embodiment, may be configured to be available to harvest power and supply supplemental power as appropriate to meet power consumption demands. At 508, a power schedule is generated for the operation based on the total demand for power and the total supply of power over the periods of operation. As previously described, the power distribution schedule may be generated in terms of periods of chronological time or a relative time from the start of the operation or another marked point during the operation, e.g., the time of takeoff. The power distribution schedule also may use time periods that may be correlated with various operational events, such as taking off, reaching cruising altitude, beginning descent, etc. At 510, power is distributed to the at least one intelligent device and other devices over the course of the operation.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A vehicle power control system, comprising:
    a power supply configured to supply a first quantity of power to at least one device configured to consume the first quantity of power based on a first power demand;
    an intelligent device, the intelligent device being configured to determine a second power demand for the intelligent device during a vehicle operation; and
    an energy management system configured to:
        communicate with the at least one intelligent device regarding the second power demand to coordinate scheduling of power distribution during the vehicle operation;
        generate a power distribution schedule to account for the first power demand of the at least one device and the second power demand of the at least one intelligent device;
        direct the first quantity of power to the at least one device according to the first power demand of the at least one device; and
        direct a second quantity of power to the at least one intelligent device according to the power distribution schedule.

2. The vehicle power control system of claim 1, wherein the power distribution schedule allocates distribution of power for each of one or more periods during the vehicle operation, wherein each of the one or more periods includes one or more of:
  a time period occurring at a specified time during the vehicle operation; and
  an event period occurring in response to an occurrence of an event during the vehicle operation.

3. The vehicle power control system of claim 1, further comprising an adaptable power source including:
  a primary power source configured to generate an expected quantity of power; and
  at least one of:
    a supplemental power source configured to provide a quantity of reserve power available to supplement the primary power source; and
    an intelligent power source configured to at least one of:
      provide a controlled quantity of power; and
      respond to a query regarding one of a current power capacity or an anticipated power capacity.

4. The vehicle power control system of claim 3, wherein the intelligent power source is further configured to receive excess power harvested from operation of at least one other source and store the power for later use.

5. The vehicle power control system of claim 3, wherein the intelligent power source includes one or more of:
  a thermoelectric device;
  a diesel generator;
  a photovoltaic cell;
  a radio frequency (RF) energy harvester;
  a vibration energy harvester;
  a turbine;
  a battery;
  an electric double-layer capacitor;
  a nuclear cell;
  a fuel cell; and
  a flywheel.

6. The vehicle power control system of claim 1, wherein the at least one intelligent device is further configured to respond to a command from the energy management system to direct the at least one intelligent device to one of:
  reduce power consumption;
  increase power consumption;
  assume a standby state from which the at least one intelligent device can resume operation upon being restarted by the energy management system; and
  power off.

7. The vehicle power control system of claim 1, wherein the at least one intelligent device includes:
  a device configured to perform an action; and
  a sensor feedback loop for the device.

8. The vehicle power control system of claim 1, further comprising a controller disposed within the at least one intelligent device, the controller being configured to determine the second power demand for the at least one intelligent device for one or more periods during a vehicle journey and to respond to the communication from the energy management system to the at least one intelligent device regarding the second power demand for each of the one or more periods.

9. The vehicle power control system of claim 8, wherein the energy management system is configured to recognize the controller and to automatically establish the communication with the at least one intelligent device.

10. The vehicle power control system of claim 1, further comprising at least one remote data concentrator configured to:
  receive data from one or more sensors; and
  communicate the data to the energy management system.

11. The vehicle power control system of claim 1, further comprising at least one remote power distribution unit configured to at least one of:
  receive the first quantity of power directed by the energy management system and distribute the first quantity of power to the at least one device; and
  receive the second quantity of power directed by the energy management system and distribute the second quantity of power to the at least one intelligent device.

12. The vehicle power control system of claim 1, wherein the energy management system is configured to generate the power distribution schedule according to a deterministic model wherein the deterministic model includes a state machine configured to:
  eliminate one or more loads based on a priority list when aggregate power demand exceeds aggregate power capacity; and
  resume the one or more loads based on the priority list when available power exists to resume providing power to the one or more loads.

13. An aircraft power distribution system, comprising:
  one or more devices;
  one or more intelligent devices, wherein each of the one or more intelligent devices includes a controller configured to determine power demands of each of the one or more intelligent devices during a flight; and
  an energy management system configured to:
    receive power from one or more power sources including:
      a primary power source configured to generate a quantity of power; and
      a supplemental power source configured to be activated by the energy management system to provide a requested quantity of power;
    communicate with the one or more intelligent devices regarding the power demands to coordinate scheduling of power distribution during the flight;
    generate a power distribution schedule to account for a power demand of the one or more devices and the one or more intelligent devices;
    modify the power distribution schedule to one of reschedule or eliminate operation of the one or more intelligent devices; and
    direct the power to the one or more devices and the one or more intelligent devices.

14. The aircraft power distribution system of claim 13, wherein the supplemental power source is further configured to harvest excess power produced by another source and to store the excess power for later use.

15. The aircraft power distribution system of claim 13, further comprising a second supplemental power source configured to provide a quantity of reserve power available to supplement the primary power source.

16. The aircraft power distribution system of claim 13, wherein the one or more intelligent devices are further configured to respond to a command from the energy management system to direct the at least one intelligent device to one of:
  increase power consumption;
  reduce power consumption;

assume a standby state from which the at least one intelligent device can resume operation upon being restarted by the energy management system; and power off.

17. The aircraft power distribution system of claim 13, wherein the power distribution schedule is generated according to a deterministic model wherein the deterministic model includes a state machine configured to:

eliminate one or more loads based on a priority list when aggregate power demand exceeds aggregate power capacity; and resume the one or more loads based on the priority list when available power exists to resume providing power to the one or more loads.

18. A method, comprising:

communicating with at least one intelligent device and at least one intelligent power source to coordinate scheduling for power distribution;

determining a total demand for power to be consumed by the at least one intelligent device and at least one additional device;

determining a total supply of power available from at least one primary power supply and the at least one intelligent power source accessible to provide additional power;

generating a power schedule for an operation based on the total demand for power and the total supply of power; and directing power to the at least one intelligent device and the at least one additional device.

19. The method of claim 18, wherein the at least one intelligent power source is configured to harvest and store a supply of power over the course of the operation and to provide the stored supply of power on demand.

20. The method of claim 18, further comprising directing a command to the at least one intelligent device to adjust power consumption according to the power schedule.

* * * * *